(12) United States Patent
Cheiky et al.

(10) Patent No.: US 8,367,881 B2
(45) Date of Patent: *Feb. 5, 2013

(54) METHOD FOR BIOMASS FRACTIONING BY ENHANCING BIOMASS THERMAL CONDUCTIVITY

(75) Inventors: Michael Cheiky, Thousand Oaks, CA (US); Ronald A. Sills, Houston, TX (US)

(73) Assignee: Cool Planet Biofuels, Inc., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,905

(22) Filed: May 9, 2011

(65) Prior Publication Data

US 2012/0286209 A1    Nov. 15, 2012

(51) Int. Cl.
*C07C 1/00* (2006.01)
(52) U.S. Cl. ............ 585/240; 585/242; 44/605; 44/606; 241/27; 241/28
(58) Field of Classification Search .................. 585/240, 585/242; 44/605, 606; 241/27, 28
See application file for complete search history.

(56) References Cited

U.S. PATENT DOCUMENTS

| | | | |
|---|---|---|---|
| 203,016 A | 4/1878 | Edison | |
| 474,230 A | 5/1892 | Edison | |
| 222,390 A | 12/1979 | Edison | |
| 4,268,275 A | 5/1981 | Chittick | |
| 4,421,524 A | 12/1983 | Chittick | |
| 4,487,958 A | 12/1984 | Ream et al. | |
| 4,497,637 A | 2/1985 | Purdy et al. | |
| 4,530,702 A | 7/1985 | Fetters et al. | |
| 4,861,351 A | 8/1989 | Nicholas et al. | |
| 4,992,480 A | 2/1991 | Mahajan et al. | |
| 5,032,618 A | 7/1991 | Marchionna et al. | |
| 5,087,786 A | 2/1992 | Nubel et al. | |
| 5,221,290 A | 6/1993 | Dell | |
| 5,504,259 A | 4/1996 | Diebold et al. | |
| 5,756,194 A | 5/1998 | Shogren et al. | |
| 5,758,194 A | 5/1998 | Kuzma | |
| 5,820,640 A | 10/1998 | Ikura et al. | |
| 5,857,807 A | 1/1999 | Longo | |
| 6,133,328 A | 10/2000 | Lightner | |
| 6,227,473 B1 | 5/2001 | Arnoki | |
| 6,339,031 B1 | 1/2002 | Tan | |
| 6,548,026 B1 | 4/2003 | Dales et al. | |

(Continued)

FOREIGN PATENT DOCUMENTS

KR    100819505    3/2008
WO    WO 2009004652    1/2009

OTHER PUBLICATIONS

Z. Rosenberg; "More on Commercial Carbon Resistors as Low Pressure Guages," Intl. Jour. of Impat Eng. 34 (2007) pp. 732-742.

(Continued)

*Primary Examiner* — Nina Bhat
(74) *Attorney, Agent, or Firm* — Sheppard Mullin Richter & Hampton LLP

(57) ABSTRACT

A method is described for generating useful chemical intermediates from biomass using a novel pyrolysis reactor that utilizes the inherent thermal properties of carbon under compression as the biomass is subjected to sequential or concurrent temperature ramps. The ramps are sufficient to volatilize and selectively create different components, while the pressure application aids the selective decomposition of the biomass.

20 Claims, 10 Drawing Sheets

U.S. PATENT DOCUMENTS

| | | | |
|---|---|---|---|
| 6,747,067 B2 | 6/2004 | Melnichuk et al. | |
| 6,811,703 B2 | 11/2004 | Elliott | |
| 6,841,085 B2 | 1/2005 | Werpy et al. | |
| 6,923,838 B2 | 8/2005 | Maubert et al. | |
| 6,994,827 B2 | 2/2006 | Safir et al. | |
| 7,033,972 B2 | 4/2006 | Shikada et al. | |
| 7,226,566 B2 | 6/2007 | Beierle | |
| 7,458,999 B2 | 12/2008 | Schenck et al. | |
| 7,846,979 B2 | 12/2010 | Rojey et al. | |
| 7,888,540 B2 | 2/2011 | Deluga et al. | |
| 8,173,044 B1* | 5/2012 | Cheiky et al. | 252/373 |
| 2003/0119952 A1 | 6/2003 | Werpy et al. | |
| 2004/0111968 A1 | 6/2004 | Day et al. | |
| 2006/0169572 A1 | 8/2006 | Meier et al. | |
| 2008/0006519 A1 | 1/2008 | Badger | |
| 2008/0093209 A1 | 4/2008 | Noto | |
| 2008/0216391 A1 | 9/2008 | Cortright et al. | |
| 2008/0223269 A1* | 9/2008 | Paoluccio | 110/342 |
| 2008/0300435 A1 | 12/2008 | Cortright et al. | |
| 2008/0317657 A1 | 12/2008 | Hall et al. | |
| 2009/0007484 A1 | 1/2009 | Smith | |
| 2009/0139139 A1 | 6/2009 | Tilman et al. | |
| 2009/0151251 A1 | 6/2009 | Manzer et al. | |
| 2009/0183430 A1 | 7/2009 | Schubert et al. | |
| 2009/0217575 A1 | 9/2009 | Raman et al. | |
| 2009/0253947 A1 | 10/2009 | Brandvold et al. | |
| 2009/0308787 A1 | 12/2009 | O'Connor et al. | |
| 2010/0040510 A1 | 2/2010 | Randhava et al. | |
| 2010/0162780 A1 | 7/2010 | Scharf | |
| 2010/0180805 A1 | 7/2010 | Cheiky | |
| 2010/0218417 A1 | 9/2010 | Bauldreay et al. | |
| 2010/0223839 A1 | 9/2010 | Perez et al. | |
| 2010/0257775 A1 | 10/2010 | Cheiky | |
| 2010/0270505 A1 | 10/2010 | Gallaspy et al. | |
| 2010/0300866 A1 | 12/2010 | Van Aardi et al. | |
| 2011/0023566 A1 | 2/2011 | Lodwig et al. | |
| 2011/0177466 A1 | 7/2011 | Cheiky | |

OTHER PUBLICATIONS

R. Buerschaper, "Thermal & Electrical Conductivity of Graphite & Carbon at Low Temperatures," Jour. of App. Physics; (1994) pp. 452-454.

I.M. Lima, "Physiochemical & Adsorption Properties of Fast-Pyrolysis Bio-Chars & their Steam Activated Counterparts," J. Chem. Biotechnical (2010) 85, pp. 1515-1521.

Cheng, Chih-Hsin; "Stability of Black Carbon in Soils Across a Climatic Gradient," Jour. of Geophysical Research Biogeosciences; 113 (2008) G02027; pp. 1-10.

Lehmann, J.; Nutrient Avail. & Leaching in an Archaeological Anthrosol & Ferraisol of the Central Amazon Basin: Fertilizer, Manure.; Plant Soil 249 (2003); pp. 343-357.

Preston, C.M.; Black (Pyrogenic) Carbon: a Synthesis of Current Knowledge & Uncertainities w/Special Consideration of Boreal Regions; Biogeosciences 3 (2006); pp. 397-420.

Tryon, E.H.; "Effect of Charcoal on Certain Physical, Chemical, & Biological Properties of Forest Soils," Ecological Monographs, vol. 18, No. 1 (Jan. 1948); pp. 81-115.

Faludi, J.; "World Changing Change Your Thinking a Carbon-Negative Fuels;" Oct. 16, 2007; www.worldchanging.com.

Laird, David; "The Charcoal Vision; A Win Win Scenario," 2008, Agron, J., vol. 100, No. 1, pp. 178-181.

Ogawa; "Carbon Sequestration by Carbonization of Biomass & Forestation; 3 Case Studies," Mitigation & Adaption Strategies for Global Change, vol. 11 (2006); pp. 429-444.

Demirbas, "Effects of Temperature & Particle Size on Bio-Char Yield from Pyrolysis of Agricultural Residues," J. Anal. Pyrolysis; vol. 72 (2004); pp. 243-248.

Kim et al.; Characteristics of Crosslinked Potato Starch & Starch-Filled Linear Low-Density Polyethylene Films, Carbohydrate Polymers, vol. 50 (2002); pp. 331-337.

Norman, et al.; "Best Management Practices for Reclaiming Surface Mines in Washington and Oregon," Open-File Report 0-92-2, revised ed. Dec. 1997; www.oregongeology.org Feb. 9, 2010.

E. Gegver & K. Hayek; "A Fully Programmable System for the Study of Catalytic Gas Reactions," 1985 J. Physc. E: Sci. Instrum. 18 836.

D.C. Elliott; "Liquid Fuels by Low-Severity Hydrotreating of Biocrude," Dev. in Thermochemical Biomass Conversion; vol. 1, pp. 611-621.

Dinesh Mohan, "Pyrolysis of Wood/Biomass for Bio-Oil: A Critical Review," Energy & Fuels (2006) 20, pp. 848-889.

Ramesh K. Sharma; "Catalytic Upgrading of Pyrolysis Oil," Energy & Fuels (1993), 7, pp. 306-314.

Thiam Leng Chew, "Catalytic Processes Towards the Production of Biofuels in a Palm Oil and Oil Palm Biomass-based Biorefinery," Bioresource Tech. 99 (2008), pp. 7911-8922.

K. Omata; "Optimization of Cu Oxide Catalyst for Methanol Synthesis under High C02 Partial Pressure Using Combinatorial Tools," App.Catalyst A: General 262 (2004), 207-214.

Kaoru Takeishi; "Dimethy Ether & Catalyst Development for Production of Syngas," Biofuels (2010) 1(1), pp. 217,226.

Z. Rosenberg; "More on Commercial Carbon Resistors as Low Pressure Guages;" Intl. Jour. of Impat Eng. 34 (2007 pp. 732-742.

R. Buerschaper; "Thermal and Electrical Conductivity of Graphite and Carbon at Low Temperatures;" Journal of Applied Physics; (1944); pp. 452-454.

I.M. Lima; "Physiochemical and Adsorption Properties of Fast-Pyrolysis Bio-Chars and their Steam Activated Counterparts;" J.Chem Tech. Biotechnical, 2010, 85: 1515-1521.

\* cited by examiner

METHOD FOR BIOMASS FRACTIONING BY ENHANCING BIOMASS THERMAL CONDUCTIVITY

TECHNICAL FIELD

The present invention relates generally to systems for making renewable fuels, and more particularly to the conversion of biomass into useful volatile and non-volatile compounds via the use of inherent compressional features of carbon.

DESCRIPTION OF THE RELATED ART

In the early 21st century, global warming and its interrelationship with the widespread use of fossil fuels has become one of the major technological challenges of our time. Finding ways to more effectively use renewable biomass is a very important avenue for addressing these issues. Prior to the beginning of the industrial revolution, wood and plant oils were the primary source of energy for pre-industrial civilizations, which used this energy mainly for heating, cooking, and light. During this early period, biomass was simply burned in open air to produce heat and light. Several thousand years ago, mankind discovered that if the air supply was restricted during the burning process, a dense black residual (which we now call coke) could be extracted from burning wood. This hot coke could be quenched with water, dried, and re-burnt to produce a much hotter, denser fire. The emergence of coke proceeds in parallel with the development of metallurgy, which is dependent upon its hotter and cleaner fire along with its reducing capabilities to both extract metals from ore and form them into useful products.

The process of roasting a combustible material in either a reduced oxygen environment or oxygen-free environment is now called pyrolysis. Pyrolyzing wood and other forms of mixed biomass produces coke (which is sometimes called biochar) and a mixture of hydrogen, carbon monoxide and carbon dioxide, sometimes referred to as synthesis gas (syngas). Roasting fossil fuel hydrocarbons in an oxygen-free environment first causes a breakdown of longer chain hydrocarbons into shorter chain hydrocarbons, ultimately resulting in more elemental forms such as methane ($CH_4$), hydrogen, and elemental carbon.

Likewise, biomass (which is made up of cellulose, hemicelluloses, lignin, starches, and lipids) proceeds through multiple steps of decomposition when subject to the pyrolysis process. In general, when subject to high temperatures (e.g., 800° C.) for prolonged periods of time, pyrolysis ultimately yields syngas. As the temperature and exposure time interval is reduced, an increasing amount of biochar residue remains. At still lower temperatures and time intervals, increasingly complex hydrocarbons and oxygenated hydrocarbons are present in the gas stream from the pyrolyzed biomass. At the low extreme, simple everyday cooking typically drives off water and starts to de-hydrolyze the biomass, causing the darkening and carmelization that we all associate with cooked foods.

Various forms of laboratory and small scale commercial biomass pyrolyzers have been developed to generate useful chemical products from the controlled pyrolysis of biomaterials ranging from wood chips to sewage sludge. Although some pyrolyzers are focused simply on producing syngas, there is considerable effort in the development of milder pyrolyzing conditions, which typically results in a condensed liquid commonly called bio-oil. Many forms of pyrolyzers have been developed at the laboratory level to produce these intermediate compounds, which are collectively referred to as bio-oil or pyrolysis oil. Configurations include simple tube furnaces where the biomass is roasted in ceramic boats, ablative pyrolyzers where wood is rubbed against a hot surface, various forms of fluidized bed pyrolyzers where biomass is mixed with hot sand, and various simpler configurations that are based on earlier coking oven designs.

The fundamental problem with the resultant pyrolysis oil is that it is made up of hundreds to thousands of compounds, which are the result of subjecting the raw biomass to a wide range of temperature, time, and pressure profiles in bulk. When this process is complicated by the thousands of major bio-compounds in the original bio-feedstock, the result is a nearly intractable array of resultant compounds all mixed together. Pyrolysis oils from such processes are typically not thermodynamically stable. They contain active oxygenated free radicals that are catalyzed by organic acids and bases such that these oils typically evolve over a period of a few days from light colored liquids to dark mixtures with tar and resinous substances entrained in the mix. Also, attempts to re-gasify pyrolysis oil typically result in additional chemical reactions, which produce additional biochar and a shift to lower molecular weight components in the resulting gas stream. Although fairly high yields of pyrolysis oil can be achieved in laboratory scale experiments, larger industrial scale demonstration projects typically produce much lower yield. This is presumably due to the wider range of temperatures, hold times, and localized pressures within the much larger heated three dimensional volumes of such scale-up architectures.

Prior art illustrating the use of pressure in biomass conversion includes U.S. Pat. No. 6,227,473, which discloses an apparatus used to pulverize material composed of dry or wet pieces with shock waves created by alternating rotors and orifice plates. U.S. Pat. No. 6,339,031 describes the formation of a microcellular carbon foam that comprises saturating a carbon fiber precursor at high temperature and pressure, then releasing the pressure suddenly, followed by a quenching, oxygen stabilization and carbonization. U.S. Patent Application No. 2009/0308787 teaches the conversion of solid or highly viscous energy carrier material such as biomass, tar or heavy crude to liquid or gaseous reaction products. The carrier material is contacted with a catalyst material such as metal oxide and clays, and both are heated to a temperature between 200 and 450° C. to form vapor phase reaction products. The latter are said to be separated from the catalyst 10 seconds after they are formed.

BRIEF SUMMARY OF EMBODIMENTS OF THE INVENTION

The present invention describes a process for generating mild pyrolysis conditions within a pyrolyzer that entrains thin sheets of biomass, and subjects the biomass to sequential or concurrent temperature ramps and pressure shocks. These temperature ramps and pressure shocks enable a high-yield release of useful volatile bio-intermediary compounds. The biomass treatment relies in part on peculiarities of the inherent compressional properties of carbon which is generated during biomass decomposition.

In various embodiments of the invention, biomass is subjected to sequential or concurrent temperature ramps and pressure shocks to produce useful volatile chemical compounds and a novel type of char (referred as BMF char). The temperature ramps are sufficient to volatilize and selectively create different biomass-derived components, while the pressure shocks aid the selective decomposition of the biomass during compression and pulverization.

One embodiment of the invention involves a method for producing a volatile biomass product, comprising: grinding a biomass feedstock to produce ground biomass particles; dispensing the ground biomass particles into thin sheets; subjecting the ground biomass to sequential or concurrent ramps of temperature and pressure shocks; selectively collecting at least one group of volatile compounds as it is released from the biomass.

A system for converting biomass to biofuel, comprising: means for grinding biomass into particles; means for dispensing the ground biomass particles into thin sheets; means for applying pressure shocks to the ground biomass; means for applying temperature ramps to the ground biomass; and means for collecting at least one group of volatile components as it is released from the biomass.

Further embodiments of the invention set forth a process and system that leads to the decomposition of biomass to produce useful volatile and nonvolatile chemical compounds.

Additional embodiments of this invention involve a process and method for the mild pyrolysis of biomass Still further embodiments of this invention involve a system and algorithm for the decomposition of biomass that utilizes the special compressional features of carbon.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 8a is an SEM picture of BMF char obtained from corn after treatment according to and embodiment of the present invention, while

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward biomass fractioning, whereby biomass is processed through a biomass fractioning system that creates a series of useful volatile components and BMF char through the application of selective temperature ramps and pressure shocks. The volatile components may be upgraded to diesel, gasoline or jet fuel. The BMF char may be reacted with any one stream of methane, carbon dioxide, steam or oxygen to create highly pure synthesis gas with a controllable range of compositions. The resulting synthesis gas may be used in any desired manner, including conversion to alcohols such as methanol, oxygenates such as dimethyl ether, and to Fischer-Tropsch products such as gasoline, diesel, lubricants and naptha.

BMF Char Generation

Figure 1:
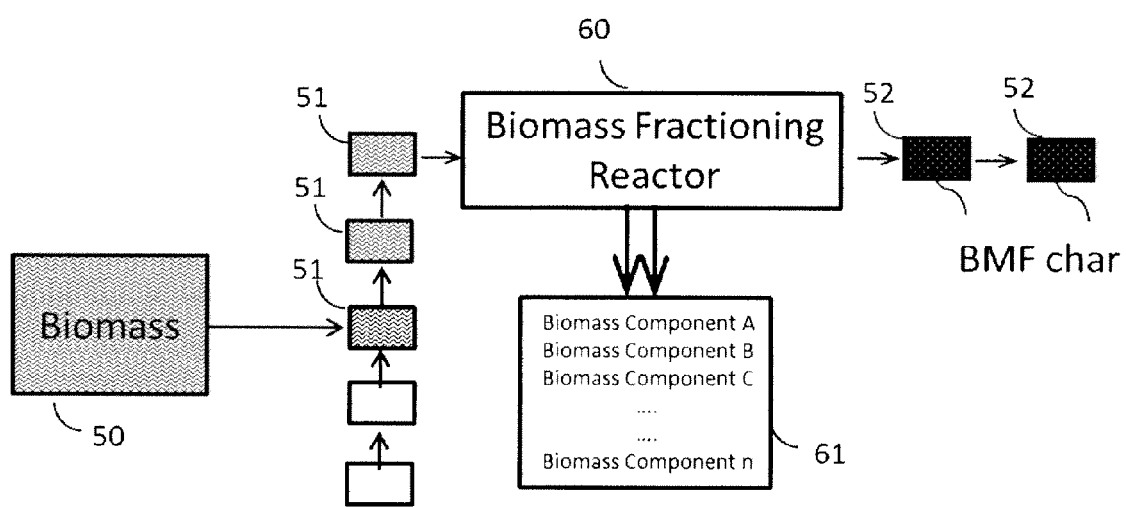
FIG. 1 is a flow diagram showing biomass conversion to BMF char with subsequent reaction in a BMF char reactor.
Figure 2:
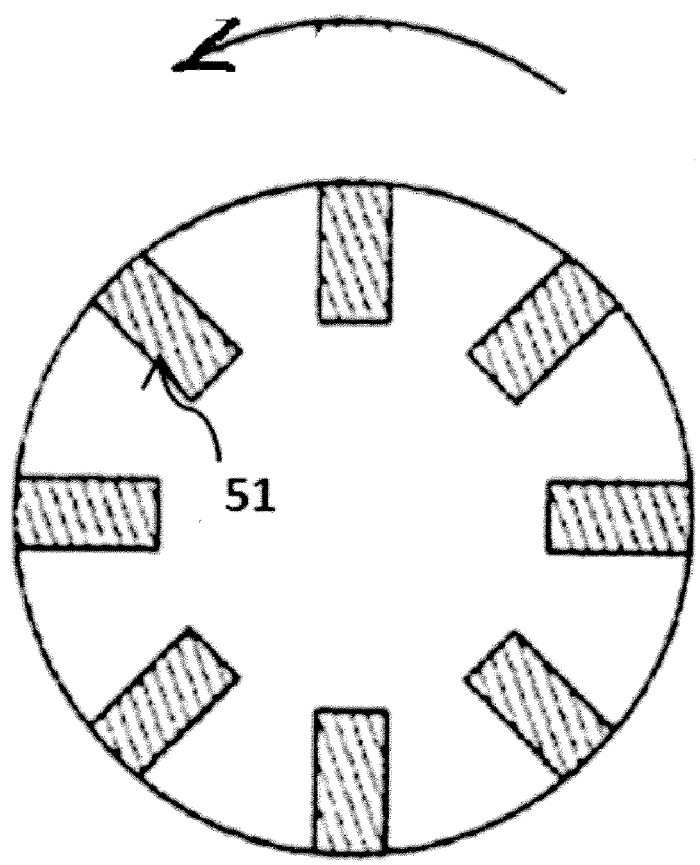
FIG. 2 illustrates an alternate method of loading biomass onto a rotating disc supporting biomass reaction chambers.

Referring now to FIG. 1, biomass 50 is loaded piecemeal onto a plurality of movable biomass reaction chambers 51. By way of example, the compartments may be made movable using conventional drive mechanisms such as gear drives, chain drives, ratcheting sprockets, etc. In addition to linear displacements, the reaction chambers 51 may also be arranged on a disc that rotates continuously or in a stepwise fashion as shown in FIG. 2. The biomass 50 is then passed to a biomass fractioning reactor 60 that allows the production of high-yield bio-intermediary compounds 61 and residual char 52 (i.e., BMF char).

As used herein, the term 'biomass' includes any material derived or readily obtained from plant sources. Such material can include without limitation: (i) plant products such as bark, leaves, tree branches, tree stumps, hardwood chips, softwood chips, grape pumice, sugarcane bagasse, switchgrass; and (ii) pellet material such as grass, wood and hay pellets, crop products such as corn, wheat and kenaf. This term may also include seeds such as vegetable seeds, fruit seeds, and legume seeds.

The term 'biomass' can also include: (i) waste products including animal manure such as poultry derived waste; (ii) commercial or recycled material including plastic, paper, paper pulp, cardboard, sawdust, timber residue, wood shavings and cloth; (iii) municipal waste including sewage waste; (iv) agricultural waste such as coconut shells, pecan shells, almond shells, coffee grounds; and (v) agricultural feed products such as rice straw, wheat straw, rice hulls, corn stover, corn straw, and corn cobs.

With further reference to FIG. 1, the biomass may be ground by a variety of techniques into a particle size suitable for dispensation into the reaction chamber 51. Particle size may range from 0.001 inch to 1 inch in diameter, limited by processing equipment size and thermal transfer rates.

Embodiments of the invention feature a biomass chamber 51 that is much wider and longer than it is thick. In some cases, biomass is dispensed into thin sheets whose total thickness is 1 to 30 times the biomass particle size. A preferred thickness for the chamber for uncompressed biomass (which is ground or chopped to $1/8$" or smaller) is approximately $3/4$" in thickness. As the biomass is heated and further pulverized (as discussed below), the emerging BMF char quickly condenses to a layer about $1/10$" thick. This aspect ratio ensures mild pyrolyzing conditions that allow the collection of useful chemical compounds known as bio-intermediary compounds as well as the production of BMF char. A person of skill in the art will appreciate that these biomass chambers can be sized in width and length along with the diameter of their corresponding drive disc to any such size as appropriate for the desired throughput for the biomass fractionator, without departing from the scope if the invention.

Figure 3:
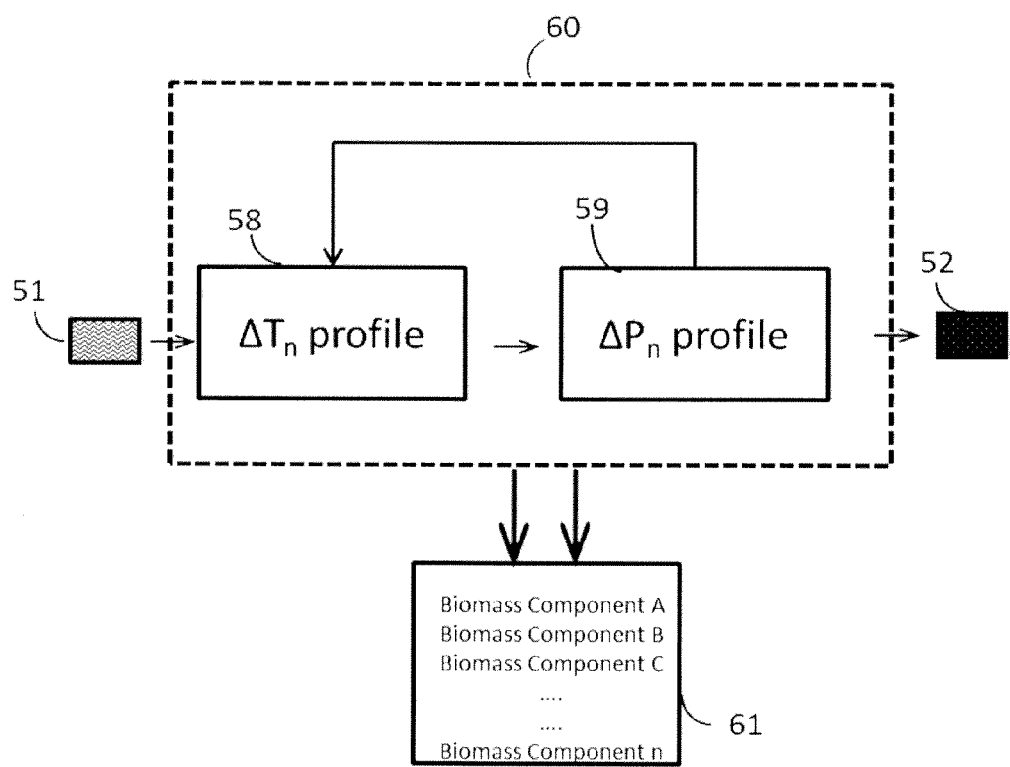
FIG. 3 is a diagram illustrating a process for generating the BMF char.

Referring to FIG. 3, the ground biomass is passed to biomass fractioning reactor 60, which subjects the biomass to a series of temperature ramp profiles ($\Delta Tn$) and pressure shock profiles ($\Delta Pn$), where n is an integer greater than 1 that describes the stages in the step-wise decomposition of the biomass. In particular, the biomass is subjected first to a heating profile $\Delta T1$, typically a linear temperature ramp, by a heating agent such as a metal anvil at processing station 58. Typically, the purpose of this first $\Delta T1$ profile is to dewater the biomass. Subsequent $\Delta Tn$ profiles end at progressively higher temperatures and serve the purpose of outgassing and of the o-chemically converting solid biomass to volatile bio-compounds. These useful bio-compounds emerge at progressively higher devolatilization temperatures. In order to accomplish this devolatilization in a selective manner, the temperature treatment is accompanied by a pressure treatment. In the illustrated embodiment, this is achieved using compacting station 59 (e.g., a series of anvils) for subjecting the biomass to accompanying pressure profiles $\Delta Pn$ comprising a sequence of pressure shocks that exploit the inherent compressional features of carbon.

In some embodiments, the temperature profiles are linear ramps ranging from 0.001° C./sec to 1000° C./sec, and preferably from 1° C./sec to 100° C./sec. Processing heating station 58 may be heated by electrical heating elements, direct flame combustion, or by directed jets of heated working gas or supercritical fluid. The heating profile and the pressure compaction profile may be linked via a feedback loop and may be applied by the same agent simultaneously. Compacting station 59 may be controlled by electrically driven devices, air compressed devices, or any other form of energy that serves to impact load the biomass. BMF char 52 remains after these processing steps.

Figure 4:
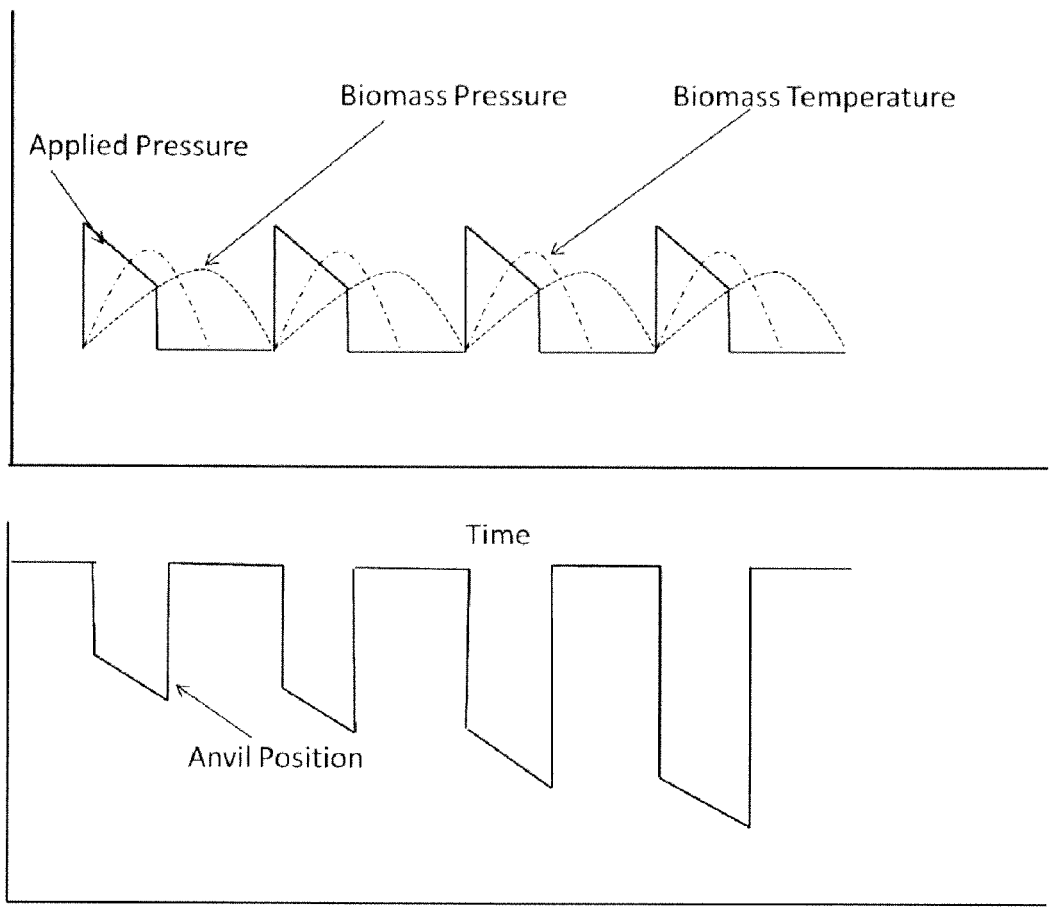
FIG. 4 illustrates an embodiment of applied pressure and temperature and corresponding biomass response.

The selective pyrolysis of the biomass arises out of the interplay between the applied pressure pulses, applied temperature and resultant pressures and temperatures experienced by the biomass. The process is illustrated diagrammatically in FIG. 4, which shows applied pressure, biomass temperature, biomass pressure and anvil position as a function of time. It is understood that a wide variety of different types of pressure pulses may be applied, and that the entire illustration is a pedagogic device. In FIG. 4, pressure shocks applied via compacting station 59 are shown as a series of triangular pressure pulses with an unspecified rest time. The process starts out by utilizing the thermal conductivity of water. The biomass is first subjected to a temperature ramp sufficient to cause the biomass to release water. The released heated water vapor is then subjected to a pressure shock which compresses the steam, thus accelerating the biomass decomposition. It may be possible for the steam to attain supercritical form, though that is not a requirement for the present invention.

With continued reference to FIG. 4, the pressure shock also aids in collapsing the biomass. A short time after peak pressure is applied, the anvil is pushed back by the pressure of extracted volatile compounds. When the volatile compounds are removed along with the steam, pressure within the biomass is decreased suddenly. Biomass temperature rapidly returns to base levels, and the anvil returns to its unextended base position. After the water has been removed entirely from the biomass, the applied temperature causes hot localized areas within the biomass that initiate carbon formation. Compressive impacts on the newly formed carbon serve in turn to increase the thermal conductivity of the carbon. The increased thermal conductivity serves to efficiently transmit heat energy needed to break down the biomass to the next stage in its decomposition. Furthermore, because carbon exhibits compressional memory, compressive impacts are sufficient to exert this effect on thermal conductivity.

The compressional memory of carbon has been indirectly demonstrated in studies of commercial carbon resistors as low pressure gauges. See Rosenberg, Z. et al *International Journal of Impact Engineering* 34 (2007) 732-742. In these studies, metal discs were launched from a gas gun at high velocity and impact an epoxy or Plexiglas target in which a carbon resistor is embedded. Resistance changes were measured as a function of time after impact. It was noted that the resistance decreased rather rapidly in less than a microsecond, and stayed low for several microseconds, in some cases over 10 microseconds, until it began to increase gradually to pre-impact levels. There is essentially a memory effect or a slow relaxation after the impact. As electrical resistance and thermal conductivity are inversely correlated for carbon as for metals (See, for example, Buerschaper, R. A. in *Journal of Applied Physics* 15 (1944) 452-454 and *Encyclopedia of Chemical Technolog,* 5th edition), these studies reveal a compression memory on the part of the carbon. This compression memory is at least partly utilized in embodiments of the invention.

Embodiments of the invention also utilize the increase in thermal conductivity as carbon is compressed. The change in electrical resistance with pressure in carbon microphones is a well-known effect utilized by carbon telephones and carbon amplifiers. U.S. Pat. No. 203,016, U.S. Pat. No. 222,390 and U.S. Pat. No. 474,230 to Thomas Edison, describe apparatus that transform sound compressions (vibrations) to changes in electrical resistance or carbon granules. Carbon is even more sensitive than most metals in its inverse relationship between electrical resistance and thermal conductivity. Below are data indicating the thermal conductivity of various substances (CRC Handbook of Chemistry and Physics, 87th edition) in comparison to the measured thermal conductivity of BMF char:

TABLE 1

| Select Thermal Conductivities in W/(m · K) | |
| --- | --- |
| Copper | 390 |
| Stainless Steel | 20 |
| Water | 0.6 |
| Dry Wood | 0.3 |
| Fuels | 0.1 to 0.2 |
| Carrier Gases (He, $N_2$, etc.) | 0.01 to 0.02 |
| Carbon Char | 0.01 to 0.05 |
| BMF char | 1 to 5 |

As the thermal conductivity of the formed carbon within the biomass increases due to pressure shocks, it becomes consequently easier to attain mild pyrolysis conditions within the biomass. As higher temperatures are reached, the fact that carbon is a better heat transfer agent than water enables higher boiling compounds to become volatile. Pressure shocks serve to compress these higher boiling compounds and contribute to fracturing cell walls within the biomass. The process is illustrated by FIG. 4 which shows anvil extension at peak pressure getting longer with subsequent pulse application, thus indicating successive biomass pulverization in conjunction with release of useful higher boiling compounds.

A variety of pressure profiles ΔPn are effective in increasing the carbon thermal conductivity. The magnitude of the pressure can vary from 0.2 MPa to 10 GPa and may be applied via a number of different technologies, including air driven pistons, hydraulically driven pistons, and explosive driven devices. The duration of the pressure application can vary from 1 microsecond to 1 week. It is understood that pressure pulses of different magnitudes and different time durations may be admixed to yield optimum results.

The efficient heat energy transfer executed by embodiments of the present invention can be enhanced by the addition of supercritical fluids in the reaction chamber. It is known that supercritical fluids can improve heat transfer as well as accelerate reaction rates. Certain embodiments can operate with supercritical carbon dioxide, supercritical water, supercritical methane, supercritical methanol, or mixtures of the above. It is possible that supercritical conditions are created internally with some pressure and temperature profiles.

A system capable of embodying the methods of the present invention is described in co-owned, co-pending U.S. Patent Application No. 2010/0180805 entitled "System and Method for Biomass Fractioning," the content of which is incorporated herein by reference in its entirety. This system comprises a biomass load and dump station, a heated pulverizing processing station for compressing the biomass, a biochar dumping station for removing residual biochar, and a plurality of biomass reaction compartments able to carry the biomass from station to station.

Example 1

Figure 5A:
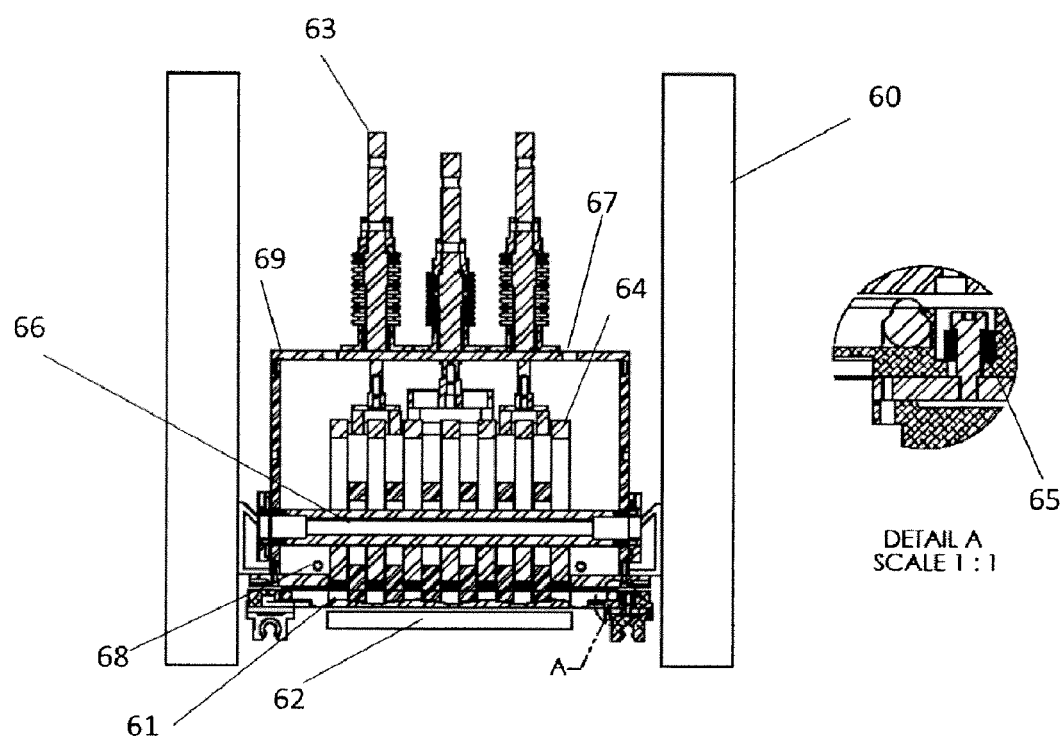
FIGS. 5a and 5b are front and perspective views, respectively, of a system for biomass conversion including indirectly heated anvils, in accordance with an embodiment of the invention.
Figure 5B:
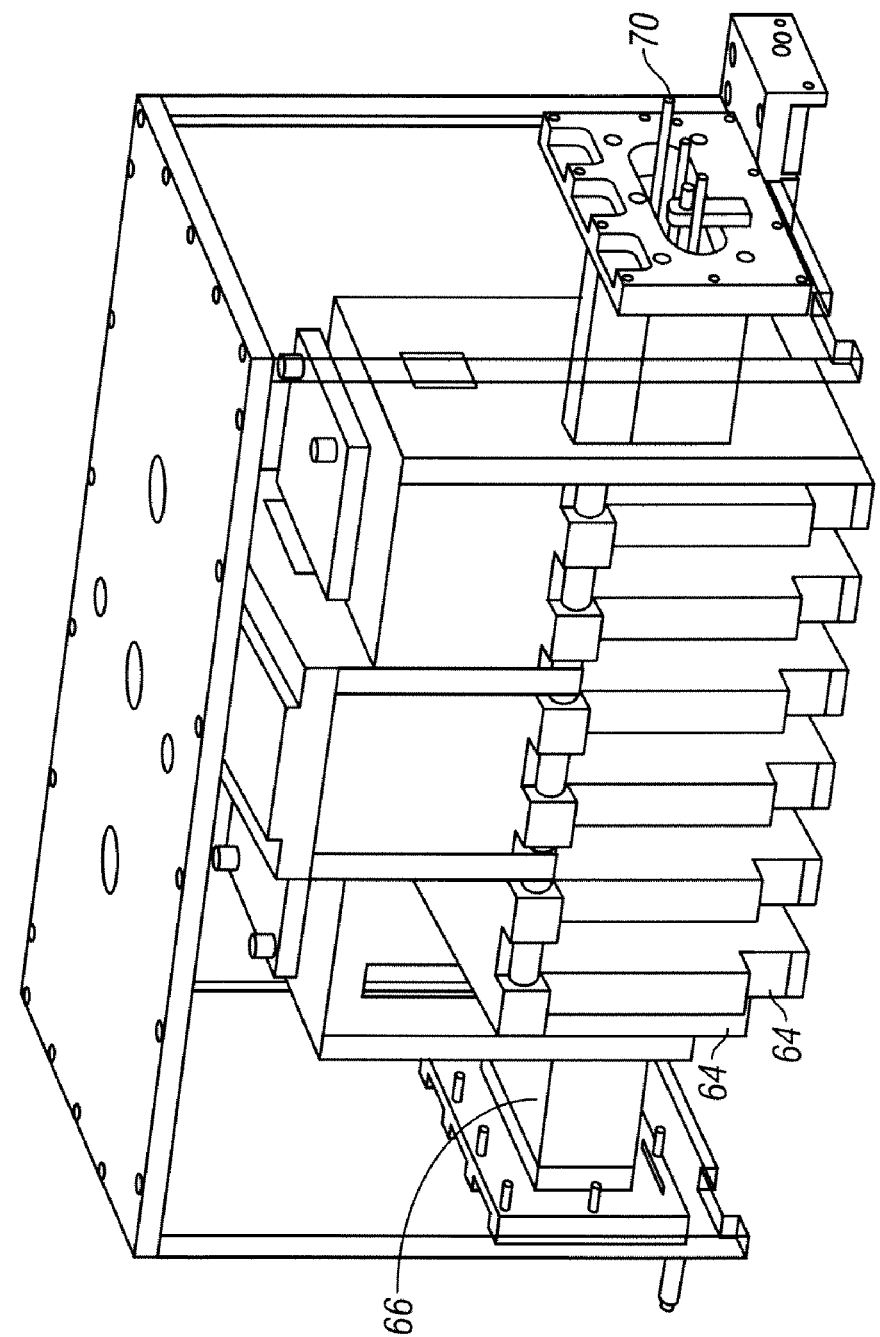

Referring to FIGS. 5a and 5b, an exemplary embodiment of a system and method for biomass fractioning by enhancing biomass thermal conductivity will now be described. In FIG. 5a, a series of anvils 64 are contained in sealed reaction chamber 69 and driven by air cylinders having platen shafts 63. In the illustrated embodiment, there are two sets of anvils 64, wherein every other anvil 64 constitutes a set and moves in unison. The anvils 64 exert pressure shocks on biomass 61, which has been ground and spread out as a thin sheet on pallet 62. The biomass 61 within the latter pallet 62 can be heated to a predetermined temperature via heated anvils 64. The reaction chamber 69 includes an orifice 67 for the exit of generated volatile compounds, and an orifice 68 for the introduction of an inert carrier gas. Anvils 64 are heated alternately when they contact heater bar 66.

FIG. 5b is a 3-dimensional illustration of the anvil assembly 64 and heater bar 66. The biomass experiences simultaneous pressure shocks and temperature ramps by the downward motion of a set of anvils 64. In the illustrated embodiment, the anvils 64 are heated on the upward stroke when the anvil 64 contacts the heater bar 66, which is heated electrically via feedthroughs 70. The bottom pallet is held in place by a semi-rigid structure that contains a damping mechanism 65 (see Detail A of FIG. 5a) to allow some relaxation after impact.

Figure 6:
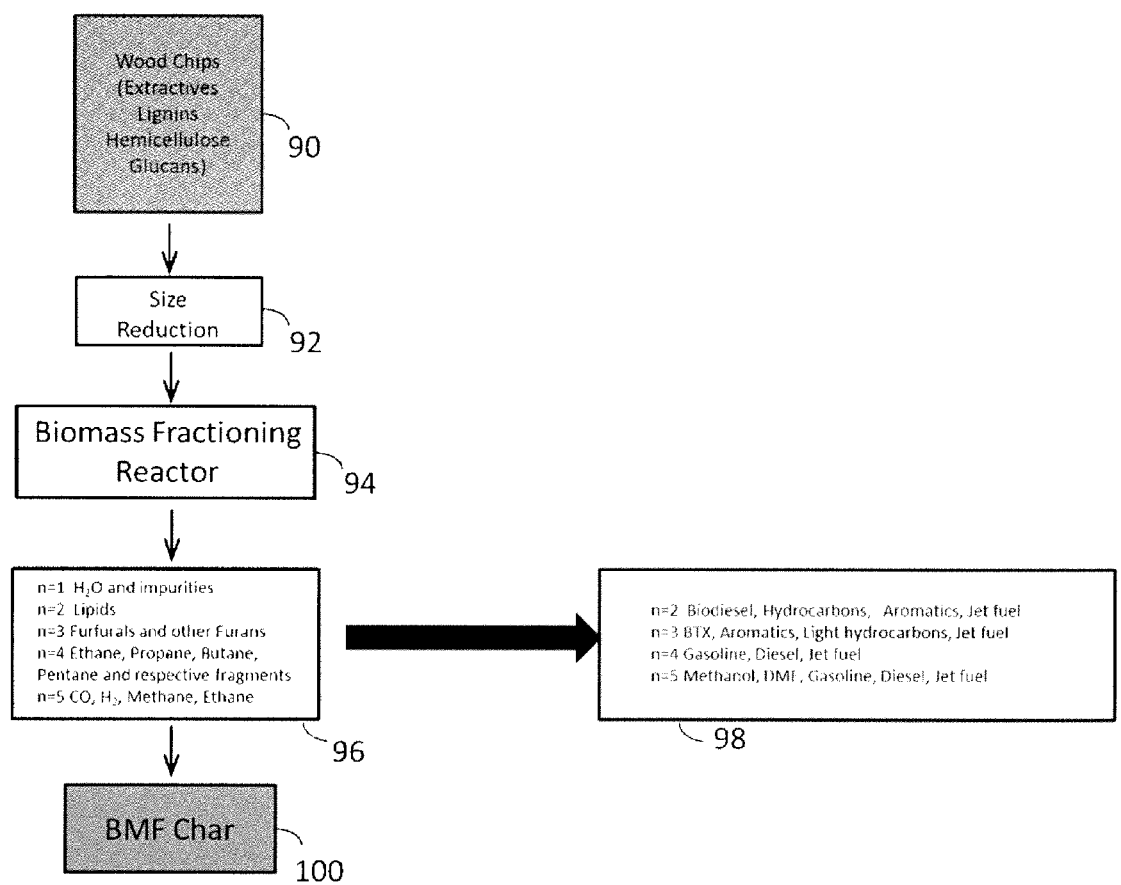
FIG. 6 is a block diagram showing process and results obtained with a specific implementation of the present invention.

Referring to FIG. 6, dried biomass 90 is provided in the form of wood chips containing extractives, lignins, hemicellulose, and glucans. Operation 92 involves a size reduction wherein the biomass is ground to 1/16" size and placed on rotating pallets in a chamber approximately 3/4" thick. Within the biomass fractioning reactor 94, the biomass is subjected to a temperature ramp of 25° C./sec in an oxygen-free atmosphere for varying amounts of time with intermittent pressure shocks of 80 MPa lasting for 2 seconds with a 50% duty cycle. The following distribution 96 of devolatilized compounds was observed:

| Stage | Volatile Compound | Char Formed | Fractionator Temperature |
|---|---|---|---|
| n = 1 | Water and water soluble impurities | | 100-150° C. |
| n = 2 | Lipids | BMF Char (2) | 150-250° C. |
| n = 3 | Furans | BMF Char (3) | 250-375° C. |
| n = 4 | C2-C5 compounds and fragments | BMF Char (4) | 375-500° C. |
| n = 5 | CO, H2 and C1, C2 compounds | BMF Char (5) | 500-650° C. |

In addition to showing devolatilized components, FIG. 6 also shows the possible conversion of devolatilized organic components to various liquid fuels 98 and the resultant BMF char 100. The chemicals can also be useful on their own as co-produced chemicals. By contrast, typical pyrolysis processes do no exhibit a clear volatilization profile as shown above.

Example 2

Figure 7:
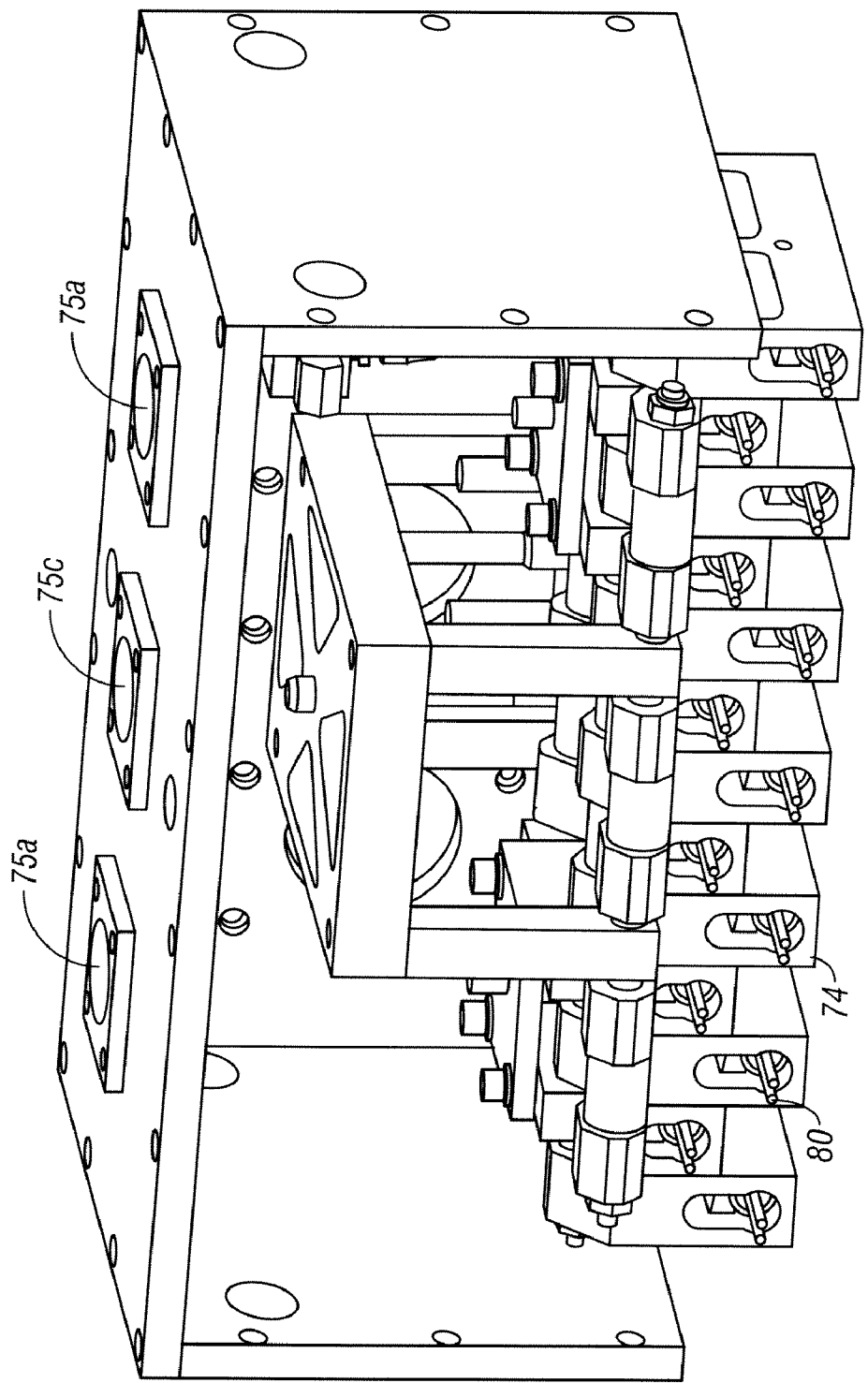
FIG. 7 is a perspective of a system for biomass conversion including directly heated anvils, in accordance with an embodiment of the invention

Referring to FIG. 7, another exemplary embodiment of a system and method for biomass fractioning by enhancing biomass thermal conductivity will now be described. In this implementation, each anvil 74 is directly heated via heat conducting electrical feedthroughs 80 attached to each anvil. Anvils 74 are again divided into two sets, each of which moves alternately to compact the biomass. The anvils 74 are heated by feedthroughs 80 to a predetermined temperature, determined by the volatilization temperature of the desired compounds. In the illustrated embodiment, one set of anvils 74 is driven by two pneumatically controlled shafts which move up and down within openings 75a, while another set of anvils 74 is driven by the center shaft (within center opening 75c).

Figure 8A:
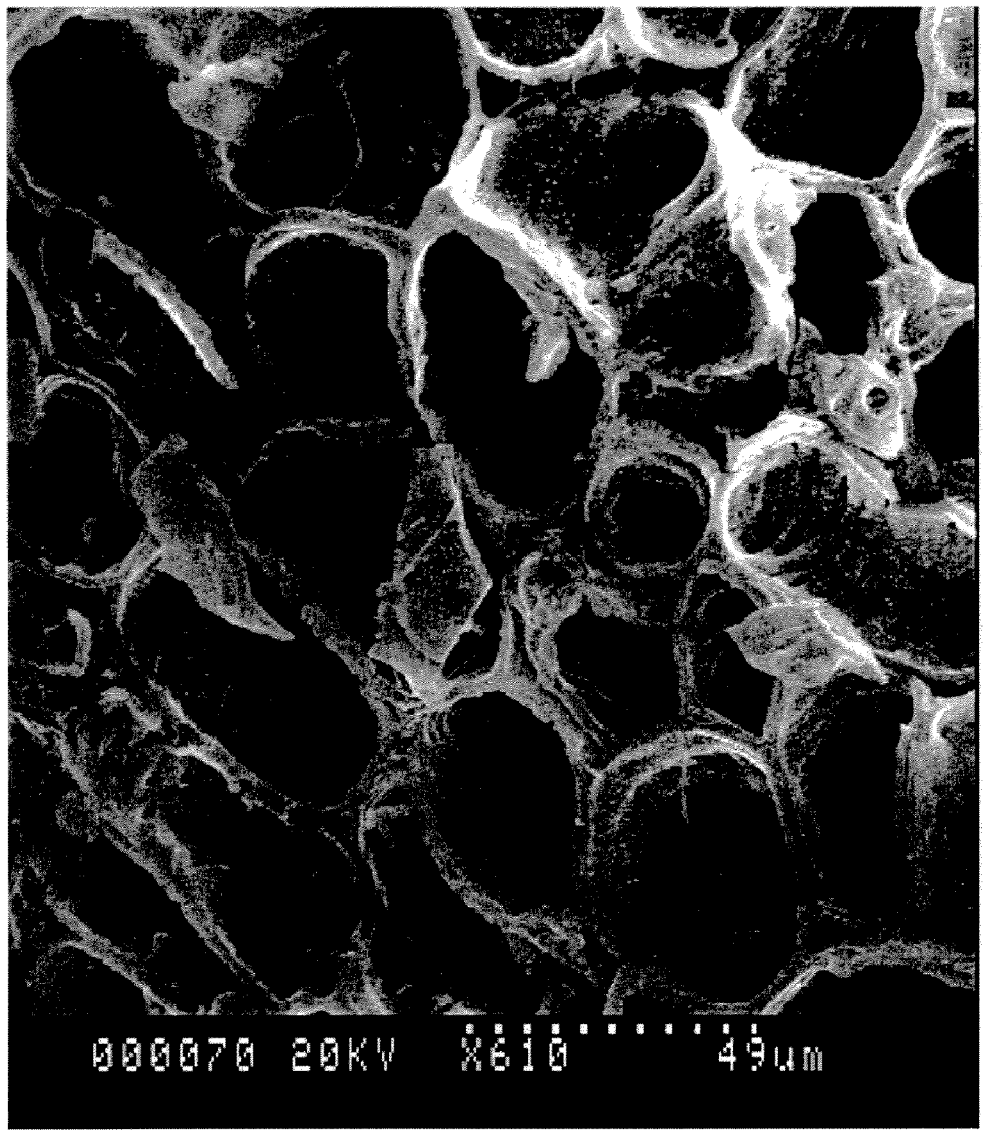
Figure 8B:
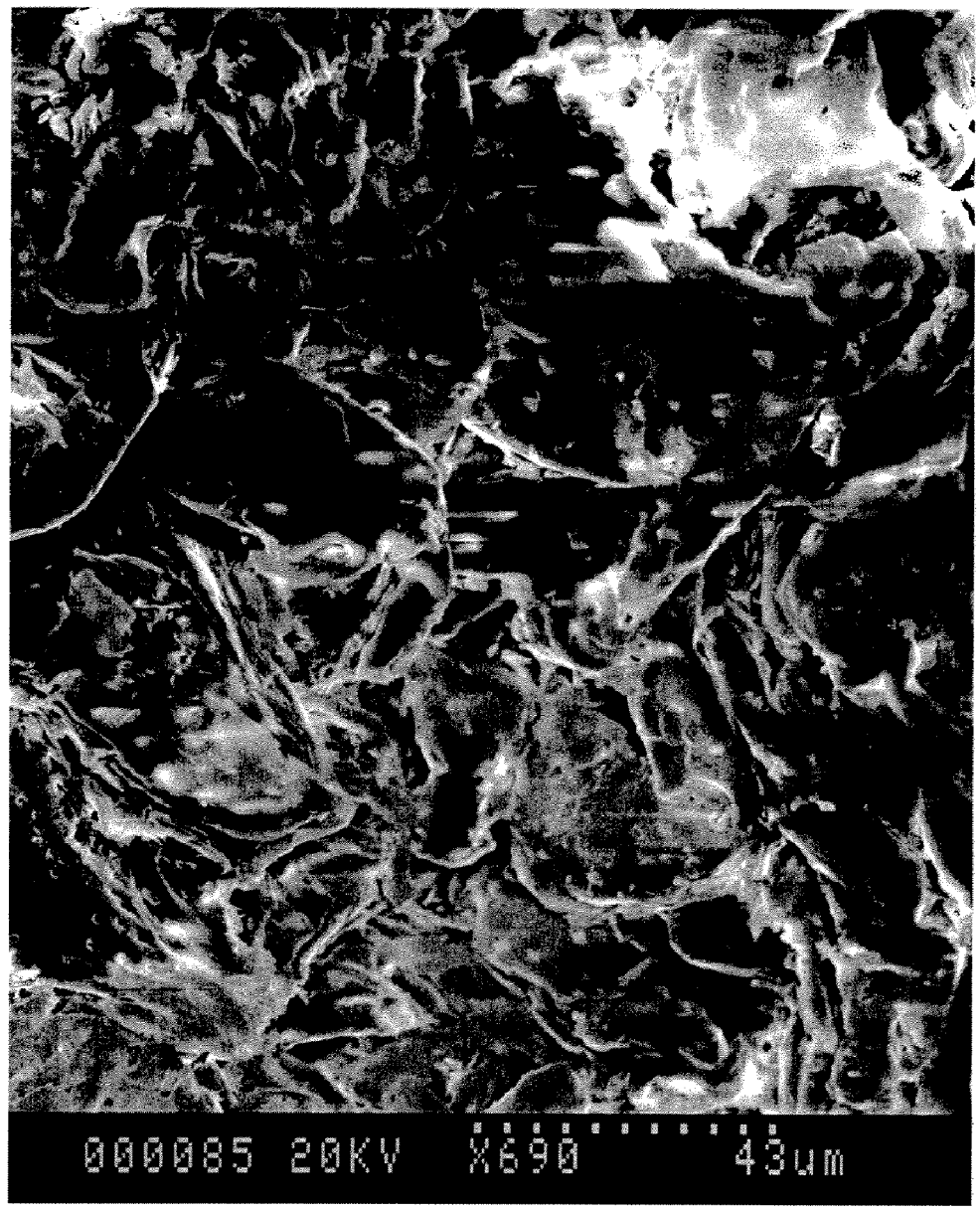
FIG. 8b is a comparative SEM of the same corn before treatment.

FIG. 8a is an SEM image of BMF char obtained from corn after treatment using a system and method for biomass fractioning, as disclosed herein. FIG. 8b is a comparative SEM image of the same corn before treatment. It is apparent from these images that the treatment has created a novel honeycomb structure within the BMF char, as depicted in FIG. 8a.

Modifications may be made by those skilled in the art without affecting the scope of the invention.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. These illustrations and their accompanying description should not be construed as mandating a particular architecture or configuration.

The invention claimed is:

1. A method for producing a volatile biomass product, comprising:
    grinding a biomass feedstock to produce ground biomass particles;
    dispensing the ground particles into thin sheets;
    subjecting the ground biomass to sequential or concurrent ramps of temperature and pressure shocks; and
    selectively collecting at least one group of volatile compounds as it is released from the biomass.

2. The method of claim 1, wherein the biomass particles are ground to a diameter in the range of 0.001 inch to 1 inch, and wherein the thin sheets have a thickness that is a multiple of the ground biomass particle diameter.

3. The method of claim 2, wherein the thickness of the thin sheets is between 1 and 30 times the biomass particle diameter.

4. The method of claim 1, wherein the ramps of temperature vary from about 0.001° C./sec to about 1000° C./sec.

5. The method of claim 4, wherein the ramps of temperature are varied over a period of time ranging from about 1 microsecond to about 1 week.

6. The method of claim 1, wherein the pressure shocks are incremented over a range of pressures.

7. The method of claim 1, wherein the pressure shocks are applied over a range of times varying from about 1 microsecond to about 1 week.

8. The method of claim 1, wherein the pressure shocks vary in magnitude from about 0.2 MPa to about 10 GPa.

9. The method of claim 8, wherein an admixture of pressure shocks of differing magnitudes are applied over a range of times.

10. The method of claim 1, wherein the biomass is subjected to a controlled gas atmosphere or supercritical fluid while being subjected to a temperature ramp.

11. The method of claim 1, wherein the biomass is subjected to a controlled gas at atmosphere or supercritical fluid while being subjected to pressure shocks.

12. The method of claim 9, wherein the group of volatile compounds includes gas components selected from the group consisting of: lipids, furans, hydrocarbons or hydrocarbon fragments, and synthesis gas.

13. The method of claim 1, wherein the temperature ramps include a sufficiently high temperature to create a carbon or carbonaceous material within the biomass.

14. The method of claim 13, wherein the pressure shocks increase thermal conductivity of formed carbon or carbonaceous material within the biomass.

15. The method of claim 13, wherein pressure shocks increase the surface area of formed carbon or carbonaceous material within the biomass.

16. The method of claim 1, wherein the pressure shocks decrease the effective density of the biomass.

17. The method of claim 1, wherein the pressure shocks aid to fracture cellulosic biomass cell walls.

18. A system for converting biomass to biofuel, comprising:
    means for grinding biomass into particles;
    means for dispensing the ground biomass particles into thin sheets;
    means for applying pressure shocks to the ground biomass;
    means for applying temperature ramps to the ground biomass; and
    means for collecting at least one group of volatile components as it is released from the biomass.

19. The method of claim 18, wherein the biomass particles are ground to a diameter in the range of 0.001 inch to 1 inch, and wherein the thin sheets have a thickness that is a multiple of the ground biomass particle diameter.

20. The system of claim 18, wherein the temperature ramps and the pressure shocks are applied simultaneously by the same means.

* * * * *